United States Patent
Lee et al.

(10) Patent No.: US 11,932,559 B2
(45) Date of Patent: Mar. 19, 2024

(54) ELECTRODE CATALYST LAYER COMPOSED OF PALLADIUM, IRIDIUM, AND TANTALUM, AND STERILE WATER GENERATING MODULE COATED WITH ELECTRODE CATALYST

(71) Applicant: COWAY CO., LTD., Gongju-si (KR)

(72) Inventors: Sang-Young Lee, Seoul (KR); Sunhyeok Park, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 503 days.

(21) Appl. No.: 17/290,289

(22) PCT Filed: Dec. 13, 2019

(86) PCT No.: PCT/KR2019/017748
§ 371 (c)(1),
(2) Date: Apr. 30, 2021

(87) PCT Pub. No.: WO2020/138793
PCT Pub. Date: Jul. 2, 2020

(65) Prior Publication Data
US 2022/0017389 A1   Jan. 20, 2022

(30) Foreign Application Priority Data
Dec. 27, 2018   (KR) .................. 10-2018-0171260

(51) Int. Cl.
*C02F 1/461*   (2023.01)
*C02F 1/467*   (2023.01)
(Continued)

(52) U.S. Cl.
CPC ........ *C02F 1/46109* (2013.01); *C02F 1/4672* (2013.01); *C22C 5/04* (2013.01);
(Continued)

(58) Field of Classification Search
CPC .. C02F 2001/46142; C22C 5/04; C22C 27/02
(Continued)

(56) References Cited

U.S. PATENT DOCUMENTS 4,339,270 A * 7/1982 Hashimoto ........... C22C 45/003
148/403
4,609,442 A * 9/1986 Tenhover ................ C25B 11/04
205/474

(Continued)

FOREIGN PATENT DOCUMENTS

CN    103866345 A    6/2014
GB    2146660 A  *  4/1985   ............. C25B 11/00
(Continued)

OTHER PUBLICATIONS

International Search Report dated Apr. 2, 2020 in PCT/KR2019/017748 filed on Dec. 13, 2019, 2 pages.
(Continued)

*Primary Examiner* — Harry D Wilkins, III
(74) *Attorney, Agent, or Firm* — Oblon, McClelland, Maier & Neustadt, L.L.P.

(57) ABSTRACT

Electrode catalytic layers coated on outer surfaces of oxidation electrode and a reduction electrode used to generate sterile water, where the electrode catalyst layers are formed on the outer surfaces of the oxidation electrode and a reduction electrode to have predetermined thickness, and are composed of iridium (Ir), palladium (Pd), and tantalum (Ta), and wherein the palladium (Pd) has a weight ratio of 10% to 30%, and a sum of the weight ratios of the iridium (Ir) and the tantalum (Ta) is 70% to 90%.

10 Claims, 6 Drawing Sheets

XRF data

| Sample | Material | Result / mass % |
|--------|----------|-----------------|
| A | Ir | 60.4 |
|   | Pd | 19.4 |
|   | Ta | 20.2 |
| B | Ir | 52.3 |
|   | Pd | 29.2 |
|   | Ta | 18.5 |
| C | Ir | 69.1 |
|   | Pd | 10.7 |
|   | Ta | 20.2 |

(51) Int. Cl.
*C22C 5/04* (2006.01)
*C25B 11/089* (2021.01)

(52) U.S. Cl.
CPC .. *C25B 11/089* (2021.01); *C02F 2001/46142* (2013.01); *C02F 2001/46152* (2013.01); *C02F 2201/4613* (2013.01); *C02F 2201/4614* (2013.01); *C02F 2201/4615* (2013.01); *C02F 2303/04* (2013.01)

(58) Field of Classification Search
USPC .................. 420/461, 427; 204/293; 502/325
See application file for complete search history.

(56) References Cited

U.S. PATENT DOCUMENTS

| | | | |
|---|---|---|---|
| 5,872,074 A * | 2/1999 | Schulz | B01J 37/06 502/328 |
| 5,954,939 A * | 9/1999 | Kanekuni | C02F 1/46104 204/278 |
| 8,366,890 B2 | 2/2013 | Urgeghe et al. | |
| 2005/0211553 A1 * | 9/2005 | Mojana | C25B 11/093 204/290.01 |
| 2008/0267809 A1 * | 10/2008 | Aimone | C22B 9/22 420/427 |
| 2009/0026088 A1 * | 1/2009 | Sumida | C02F 1/4672 205/742 |
| 2011/0209992 A1 * | 9/2011 | Urgeghe | C25B 11/093 204/263 |
| 2016/0193571 A1 * | 7/2016 | Moon | C01B 13/0207 148/668 |
| 2022/0073380 A1 * | 3/2022 | Schneider | C02F 1/4676 |

FOREIGN PATENT DOCUMENTS

| | | |
|---|---|---|
| JP | 2011-149044 A | 8/2011 |
| JP | 2014-131792 A | 7/2014 |
| KR | 10-2007-0117523 A | 12/2007 |
| KR | 10-2010-0067829 A | 6/2010 |
| KR | 10-2017-0075528 A | 7/2017 |
| KR | 10-2018-0032111 A | 3/2018 |

OTHER PUBLICATIONS

Khan, M. A. et al., "Recent Progresses in Electrocatalysts for Water Electrolysis," Electrochemical Energy Reviews, vol. 1, 2018, pp. 483-530.

Park, J. E. et al., "Electrocatalytic Activity of Pd/Ir/Sn/Ta/TiO$_2$ Composite Electrodes," Energies, vol. 11, 3356, 2018, pp. 1-9.

Combined Chinese Office Action and Search Report dated Jul. 26, 2022 in Chinese Patent Application No. 201980078323.3, 9 pages.

\* cited by examiner

130: Current control unit

FIG 4

※ Evaluation of microorganisms (Blank : E.coli 5.9 x 10^5 cfu/ml)

| Cl₂ conc. (ppm) | | Time elapsed | | | | | | |
|---|---|---|---|---|---|---|---|---|
| Target concentration | Measured concentration | Immediately after contact | 5s | 10s | 30s | 1m | 5m | 10m |
| 2 | 2.1 | ND | ND | ND | ND | ND | ND | ND |
| 1 | 1.14 | ND | ND | ND | ND | ND | ND | ND |
| 0.5 | 0.61 | ND | ND | ND | ND | ND | ND | ND |
| 0.25 | 0.29 | 13 | 1 | ND | ND | ND | ND | ND |
| 0.125 | 0.1 | 10^5 level | 10^3 level | 74 | ND | ND | ND | ND |

| Sample | Material | Result / mass % |
|---|---|---|
| A | Ir | 60.4 |
|   | Pd | 19.4 |
|   | Ta | 20.2 |
| B | Ir | 52.3 |
|   | Pd | 29.2 |
|   | Ta | 18.5 |
| C | Ir | 69.1 |
|   | Pd | 10.7 |
|   | Ta | 20.2 |

FIG 9

ELECTRODE CATALYST LAYER COMPOSED OF PALLADIUM, IRIDIUM, AND TANTALUM, AND STERILE WATER GENERATING MODULE COATED WITH ELECTRODE CATALYST

TECHNICAL FIELD

The present invention relates to an electrode catalyst layer consisting of palladium (Pd), iridium (Ir), and tantalum (Ta) and a sterile water generating module, on which the electrode catalyst layer is coated, and more particularly, to an electrode catalyst layer by which generation of mixed oxidant (MO) may be maintained for a long time as palladium (Pd), iridium (Ir), and tantalum (Ta) are combined at specific ratios, and a sterile water generating module including the same.

BACKGROUND ART

In recent years, as people's incomes have increased, the standard of living has also increased such that it has been increasingly necessary for general water for living such as washing water as well as drinking water to be purer, or for water of high quality to be used. Accordingly, interest in purification and sterilization of water has increased, and thus various devices for purification and sterilization of water have been developed, and in particular, bidets and water purifiers have been widely developed and supplied to homes.

In general, water purification is performed by using various filters, and water sterilization is performed by using chemical sterilizing agents, mainly chlorine-based agents, etc., or by using sterilizing devices that use ozone, ultraviolet rays, ultrasonic waves, and the like.

However, when the conventional sterilizing device uses a chemical sterilizing agent, a filtering process has to be additionally carried out because a sterilizing agent is additionally added for sterilization, and when a sterilizing device is used, it is necessary to install a separate device that generates ozone or ultraviolet rays, in which case the device becomes complicated, and a burden of installation costs is added.

Meanwhile, a sterile water producing device has been proposed that uses chlorine ions contained in water for sterile water through electrolysis, and an electrode including a coating layer consisting of iridium oxide, tantalum oxide, and platinum on an electrode plate for electrolysis has been proposed.

The chlorine generation efficiency of the electrode is higher than that of a platinum-plated electrode, but the chlorine generation efficiency slowly decreases as the number of repeated uses increases, and as a result, the chlorine generation efficiency decreases to 30% or less of the initial efficiency such that the life span of the electrode is fatally short.

A related conventional technology is disclosed in Korean Patent Application Publication No. 10-2010-0067829, which is entitled "Sterilizing Device Including Electrode Sterilizing Module", and includes a body, in which a sterilizing liquid is accommodated, and at least one or more electrode sterilizing modules alternately connected to a power source including a negative electrode or a positive electrode and disposed in the body, and in the electrode sterilizing modules, a catalyst is coated on a conductive base part.

However, according to the conventional technology, only kinds of components that may be coated on a catalyst layer are simply listed, and a detailed configuration of the catalyst layer and the ratios of the components of the catalyst layer are not disclosed at all.

Accordingly, the configuration of the catalyst layer and the ratios of the components of the catalyst layer, which may maximize the use life span of the catalyst layer while the sterilizing device using an electrolysis principle maintains the initial efficiency, have been increasingly required.

(Patent Document 1) Korean Patent Application Publication No. 10-2010-0067829

DISCLOSURE

Technical Problem

The present invention has been made in an effort to solve the above-mentioned problems, and proposes a configuration of a catalyst layer having improved durability, by which a catalyst layer coated on electrode plates is prevented from being eluted easily, even when the catalyst layer is used for a long time, and the ratios of the components of the catalyst layer.

The present invention also proposes a configuration of a catalyst layer which may have an extended use life span as sterile water is maintained at a value that is a specific MO concentration or more even though the catalyst layer is used for a long time, and the ratios of the components of the catalyst layer.

Technical Solution

The present invention provides electrode catalytic layers 112 and 122 coated respectively on outer surfaces of an oxidation electrode 110 and a reduction electrode 120 used to generate sterile water, wherein the electrode catalyst layers 112 and 122 are formed on the outer surfaces of the electrodes 110 and 120 to have a predetermined thickness, and are composed of iridium (Ir), palladium (Pd), and tantalum (Ta), and wherein the palladium (Pd) has a weight ratio of 10% to 30%, and a sum of the weight ratios of the iridium (Ir) and the tantalum (Ta) is 70% to 90%.

It is preferable that the weight ratios of the iridium (Ir), the palladium (Pd), and the tantalum (Ta) are 60%, 20%, and 20%, respectively.

It is preferable that the weight ratios of the iridium (Ir), the palladium (Pd), and the tantalum (Ta) are 50%, 30%, and 20%, respectively.

It is preferable that the weight ratios of the iridium (Ir), the palladium (Pd), and the tantalum (Ta) are 70%, 10%, and 20%, respectively.

It is preferable that the thickness of the catalyst layers 112 and 122 is 0.3 μm to 5 μm.

It is preferable that the mixed oxidant (MO) concentration of the sterile water is maintained at 0.5 ppm or more.

The present invention also provides a sterile water generating module 100 including the electrode catalyst layer above, the sterile water generating module 100 including: a pair of oxidation electrode 110 and reduction electrode 120 spaced apart from each other by a predetermined gap; a current control unit 130 configured to allow current to flow through the oxidation electrode 110 and reduction electrode 120; and a sterile water generating unit 140, on which the pair of electrodes are mounted, and configured to generate sterile water from source water supplied between the pair of oxidation electrode 110 and reduction electrode 120.

It is preferable that each of the pair of oxidation electrode 110 and reduction electrode 120 has a plate shape and is disposed to stand vertically and horizontally, and that the source water is supplied into the predetermined gap.

It is preferable that the current control unit 130 controls such that a forward potential and a reverse potential are repeated in the pair of oxidation electrode 110 and reduction electrode 120 at a predetermined time interval, and the mixed oxidant (MO) concentration of the sterile water generated by the sterile water generating unit 140 is controlled by adjusting the strengths of currents applied to the pair of oxidation electrode 110 and reduction electrode 120.

It is preferable that the predetermined time interval is 10 seconds, a forward potential of 10 seconds and a resting state of 1.0 seconds are repeated one to sixty times, and a reverse potential of 10 seconds and a resting state of 10 seconds are repeated one to sixty times, and the source water supplied to the sterile water generating unit 140 is supplied at a speed of 0.3 L/min to 1.5 L/min (liters per minute; LPM).

Advantageous Effects

The present invention has the following effects.

According to the present invention, because the catalyst layer coated on the electrodes consists of iridium (Ir), palladium (Pd), and tantalum (Ta) of specific ratios, the catalyst layer is maintained as not delaminated even when numerous cycles are repeated, and thus the durability of the catalyst layer is improved.

Furthermore, because the MO concentration may be maintained at 0.5 ppm or more even when numerous cycles are repeated, the use life span is extended, and thus the sterile water generating module having an excellent economic efficiency may be provided to consumers.

DETAILED DESCRIPTION OF EMBODIMENTS

Hereinafter, an electrode catalyst layer according to the present invention and a sterile water generating module, on which the electrode catalyst layer is coated, will be described with reference to the drawings. Furthermore, the sterile water generating module according to the present invention may be applied to a bidet, a humidifier/air cleaner, a water purifier, and an ionic water device, and it is noted in advance that the present invention is not limited thereto, and the sterile water generating module may be applied to any device that may perform sterilization.

Structure of Electrode Catalyst Layer and Sterile Water Generating Module

Figure 1:
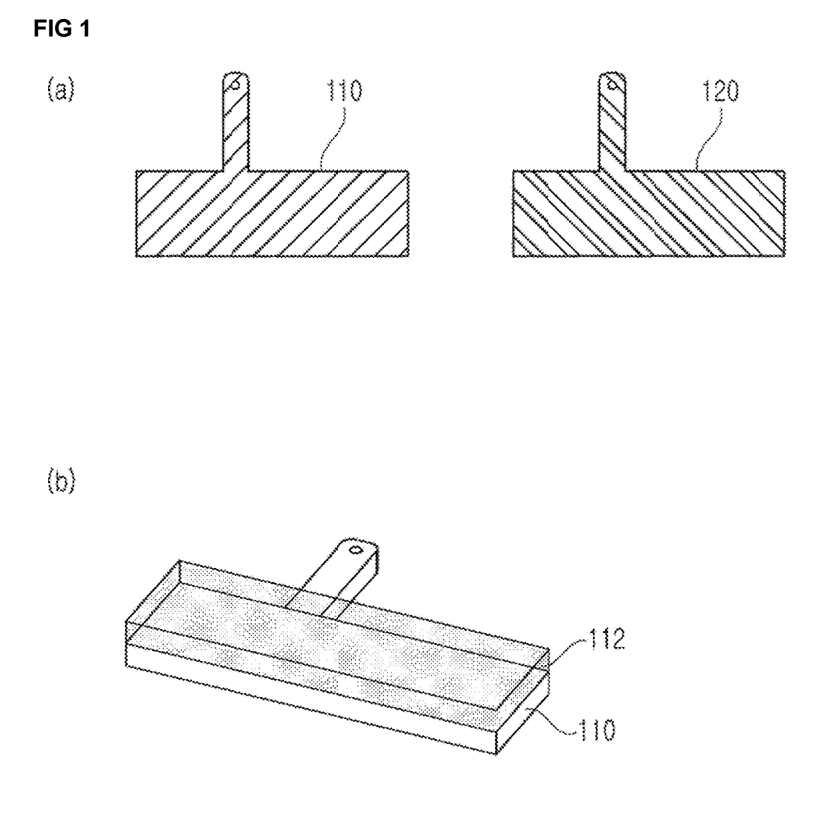
FIG. 1A is a plan view of an oxidation electrode and a reduction electrode, on which a catalyst layer is coated according to the present invention.
FIG. 1B is a schematic perspective view of the oxidation layer, on which the catalyst layer is coated.

FIG. 1A is a plan view of an oxidation electrode 110 and a reduction electrode 120, on which a catalyst layer 112, 122 is coated respectively according to the present invention, and FIG. 1B is a schematic perspective view of the oxidation layer, on which the catalyst layer is coated.

Referring to FIGS. 1A and 1B, the sterile water generating module 100 according to the present invention includes a pair of oxidation electrode 110 and reduction electrode 120, and the pair of oxidation electrode 110 and reduction electrode 120 include an oxidation electrode 10, in which an oxidation reaction occurs, and a reduction electrode 120, in which a reduction reaction occurs. Here, the oxidation electrode 110 and the reduction electrode 120 may consist of titanium, and the thicknesses of the oxidation electrode 110 and the reduction electrode 120 may be 0.5 mm to 2 mm.

Furthermore, each of the oxidation electrode 110 and the reduction electrode 120 includes an extension part on one side thereof to be electrically connected to a current control unit 130, which will be described below. The extension part may have a through-hole for stable electrical connection with the current control unit 130, and may also be physically fixed through the through-hole. Although FIGS. 1A and 1B illustrate only a shape having the extension part, the shape may be modified according to selection by a designer.

FIG. 1B illustrates the oxidation electrode 110, on which the catalyst layer 112 is coated, and the catalyst layer 112 may be coated on the electrode through electric plating, chemical deposition, spraying, or painting using a brush. Here, the thickness of the catalyst layer 112 may be 0.3 μm to 5 μm, and no catalyst layer 112 may be formed on the extension part provided for connection with the current control unit 130. Although FIG. 1B illustrates only the oxidation electrode 110, the reduction electrode 120 also may have the same structure as the oxidation electrode 110, and a detailed configuration of the catalyst layer 112, 122 and the ratios of the components of the catalyst layer 112, 122 will be described later.

Figure 2:
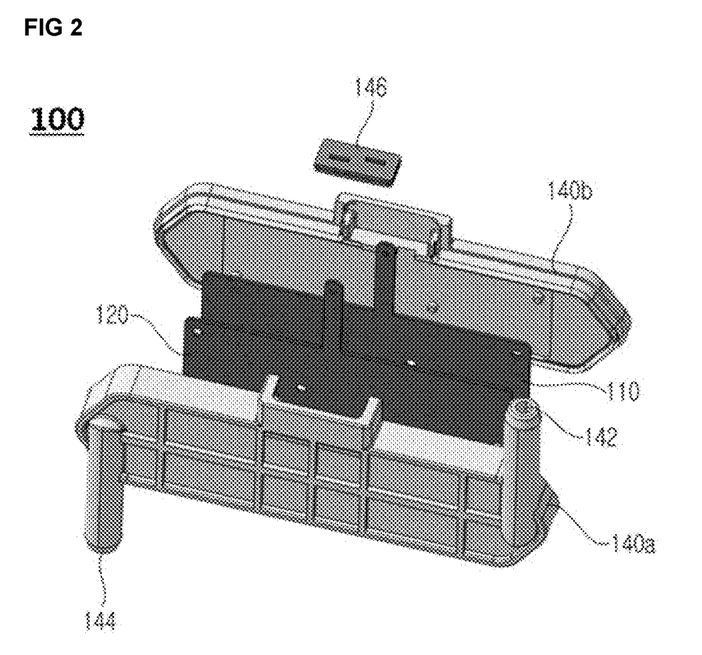
FIG. 2 is an exploded perspective view of an oxidation water generating module according to the present invention.
Figure 3:
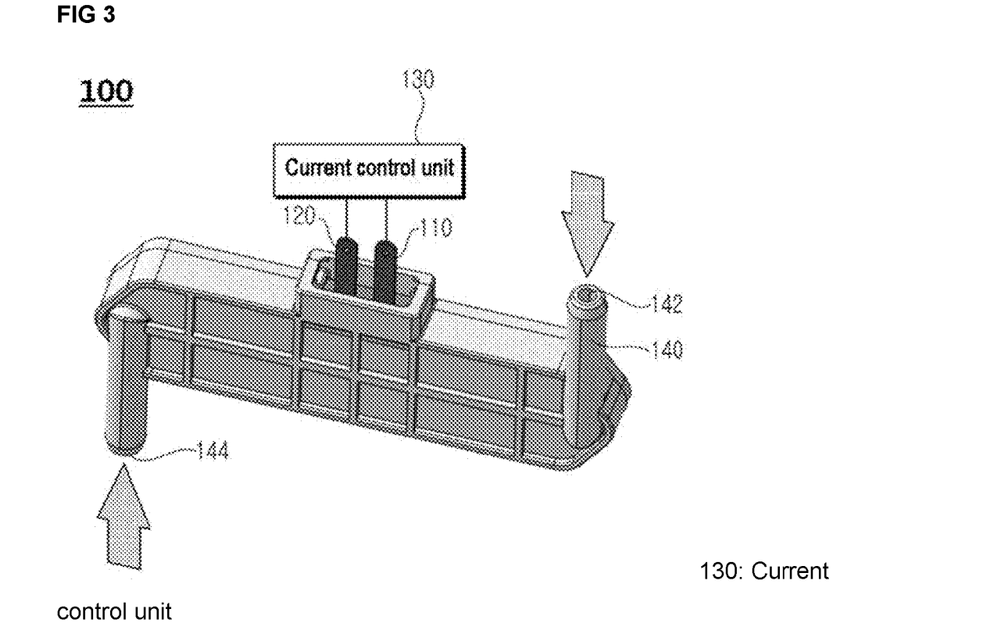
FIG. 3 is a schematic perspective view of the oxidation water generating module according to the present invention.

FIG. 2 is an exploded perspective view of an oxidation water generating module according to the present invention, and FIG. 3 is a schematic perspective view of the oxidation water generating module according to the present invention.

Referring to FIGS. 2 and 3, the oxidation water generating module 100 according to the present invention includes an oxidation electrode 110, a reduction electrode 120, a current control unit 130, and a sterile water generating unit 140.

The oxidation electrode 110 and the reduction electrode 120 are disposed such that the extension parts thereof face the upper side, and the oxidation electrode 110 and the reduction electrode 120, which have plate shapes, are disposed to stand vertically. Here, a predetermined space may be formed between the oxidation electrode 110 and the reduction electrode 120, source water may be supplied into the space, and sterile water may be generated through chemical reaction of the supplied source water and the electrodes 110 and 120.

Meanwhile, the oxidation electrode 110 and the reduction electrode 120 may be installed horizontally instead of being disposed to stand vertically, and the disposition of the oxidation electrode 110 and the reduction electrode 120 may be appropriately changed according to selection by a designer as long as the pair of electrodes have a structure in which the pair of oxidation electrode 110 and reduction electrode 120 face each other while being spaced apart from each other.

The current control unit 130 functions as a power source that applies currents to the oxidation electrode 110 and the reduction electrode 120. Furthermore, the current control unit 130 may control such that a forward potential and a reverse potential are repeated at a predetermined time interval, and the mixed oxidant (MO) concentration of the sterile water generated by the sterile water generating unit 140 may be controlled by adjusting the strengths of the currents applied to the pair of electrodes 110 and 120. In more detail, the current control unit 130 may adjust the strengths of the currents according to the TDS concentration of the source water, and for example, the concentration of the generated sterile water may be maintained at 1 ppm or more by applying a current of 0.2 Å to 1 Å when the TDS concentration of the source water is 300 mg/L. Meanwhile, when the strengths of the currents are increased to be higher than the value, deterioration of the electrodes 110 and 120 and the catalyst layers 112 and 122 may become more severe.

The sterile water generating unit 140 acts as a space in which the supplied source water is temporarily stored, and may include an inlet hole 144 and an outlet hole 142. Here, the locations of the inlet hole 144 and the outlet hole 142 may be mutually changed. The sterile water generating, unit 140 may be disassembled to a first frame 140a and a second frame 1410 and be assembled, and may be assembled and sealed after the oxidation electrode 110 and the reduction electrode 120 are embedded between the first frame 140a and the second frame 140b. Here, openings may be formed on an upper side of the sterile water generating unit 140 such that the extension parts of the electrodes 110 and 120 protrude to the outside, and a fixing member 146 may be provided to physically fix the oxidation electrode 110 and the reduction electrode 120. Slits may be formed in the fixing member 146 such that the extension parts of the electrodes 110 and 120 are inserted into the silts and are fixed, and as the extension parts of the electrodes 110 and 120 are inserted into the slits and are fixed, the oxidation electrode 110 and the reduction electrode 120 may be maintained to have a predetermined gap. Furthermore, the fixing member 146 functions to prevent a liquid-state adhesive for sealing (e.g., epoxy) from penetrating into the sterile water generating unit.

Configuration of Electrode Catalyst Layer and Ratios of Components Thereof

Figure 4:
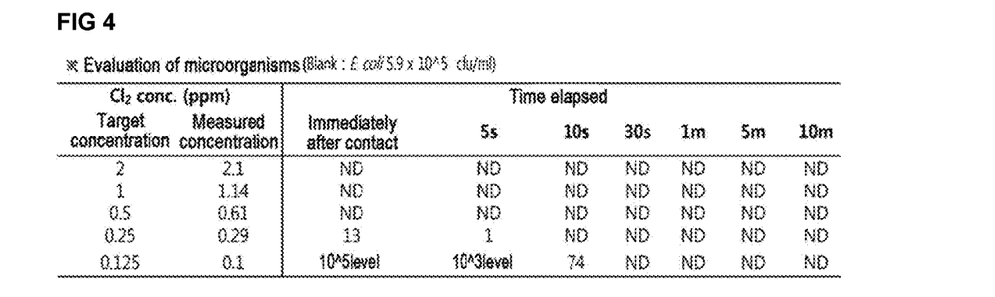
FIG. 4 is an experimental data table obtained by evaluating microorganisms to set the concentration of sterile water.

FIG. 4 is an experimental data table obtained by evaluating microorganisms to set the concentration of sterile water. Referring to FIG. 4, Evaluation of microorganisms was performed for setting of an appropriate concentration of the sterile water, and the appropriate concentration of the sterile water was determined through the number of surviving microorganisms of *E. coli*. In FIG. 4, "ND" means "not detected", and "too numerous to count" ("TNTC") means that the number of the *E. coli* is too numerous to count.

In the case in which the sterile water and the microorganisms contacted each other when the target concentration of the MO concentration was 0.5 ppm, the microorganisms died immediately, and the same result was obtained when the MO concentration was 0.5 ppm or more. Accordingly, it can be seen that it is most preferable that the sterile water is in a direct water type and the MO concentration of the sterile water is 0.5 ppm.

Figure 5:
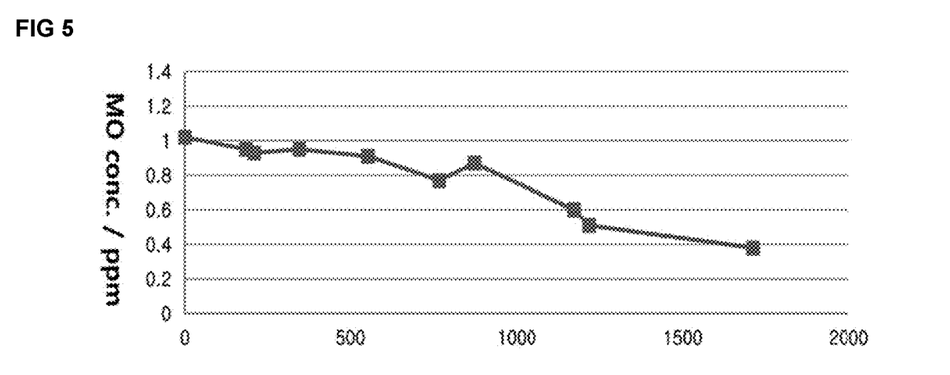
FIG. 5 is a graph depicting a change in an MO concentration when a cycle is performed while a catalyst layer consisting of only iridium (Ir) and tantalum (Ta), as a comparative example of the catalyst layer of the present invention.

FIG. 5 is a graph depicting a change in an MO concentration when a cycle is performed while a catalyst layer 112, 122 consists of only iridium (Ir) and tantalum (Ta) as a comparative example of the electrode catalyst layer of the present invention. In the comparative example illustrated in FIG. 5, the MO concentration of the sterile water decreased to 0.5 ppm or less during 1,000 to 1,500 cycles, and this is a life span that was significantly lower than 60,000 cycles, which was a target life span. In this way, it can be seen that the life span was significantly short in the comparative example, in which the catalyst layer 112, 122 consisting of only iridium (Ir) and tantalum (Ta) was used, as compared with the first to third embodiments of the present invention.

For reference, in relation to the experimental condition of FIG. 5, the supply speed of the source water is 1 L/min (liters per minute; LPM), cycle 1 corresponds to a forward potential of 10 seconds and a resting state of 10 seconds, cycle 2 corresponds to a reverse potential of 10 seconds and a resting state of 10 seconds, and the cycles are continuously repeated. Further, forward potentials of one to sixty times and reverse potentials of one to sixth times may be repeated.

FIG. 6A illustrates a picture (the left side) obtained by observing an upper side of an electrode through an electron microscope and a graph (the right side) obtained by spectrum-analyzing the upper side of the electrode in the state of the catalyst layer of the comparative example of FIG. 5, and FIG. 6B illustrates a picture (the left side) obtained by observing a lower side of an electrode through an electron microscope and a graph (the right side) obtained by spectrum-analyzing the lower side of the electrode.

As described above, the oxidation electrode 110 and the reduction electrode 120 are disposed to stand vertically, and the lower sides of the electrodes rather than the upper sides of the electrodes directly contact the source water more frequently. Here, the catalyst layer 112, 122 on the lower sides of the electrodes 110 and 120 may be dissolved and eluted in a process of applying a reverse potential, and because it means that the catalyst for generating the sterile water disappears when the catalyst layer 112, 122 is eluted, the generation efficiency of the sterile water deteriorates severely.

Figure 6:
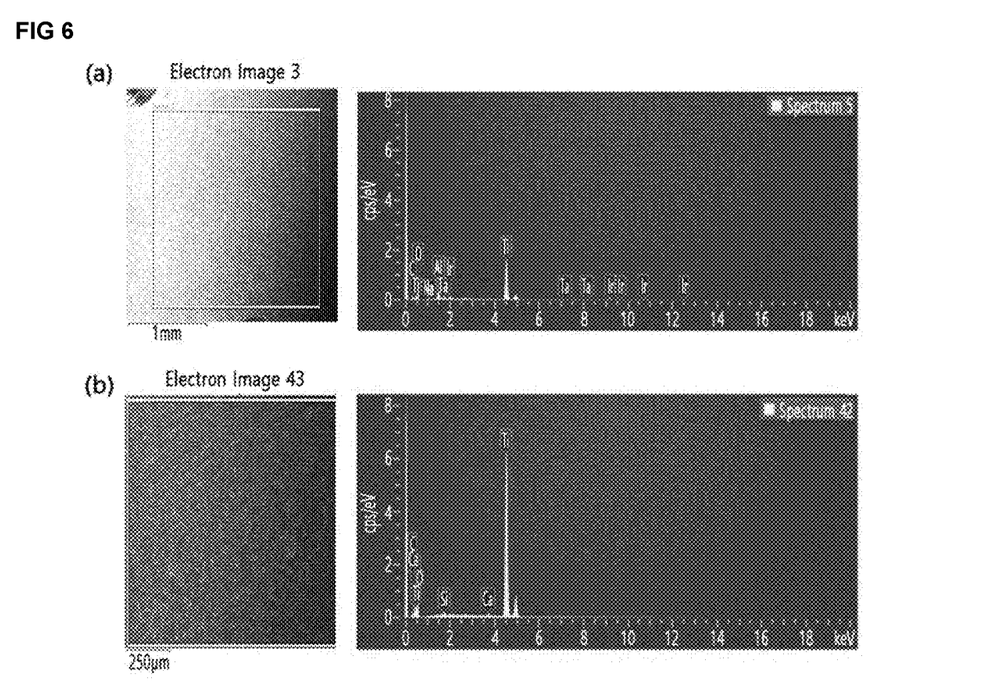
FIG. 6A illustrates a picture (the left side) obtained by observing an upper side of an electrode through an electron microscope and a graph (the right side) obtained by spectrum-analyzing the upper side of the electrode in the state of the catalyst layer of the comparative example of FIG. 5.
FIG. 6B illustrates a picture (the left side) obtained by observing a lower side of an electrode through an electron microscope and a graph (the right side) obtained by spectrum-analyzing the lower side of the electrode.

In the graph obtained by analyzing the spectrums of the upper and lower sides of the electrode of FIG. 6, the spectra of iridium (Ir) and tantalum (Ta) could be observed on the upper side, but the spectra of iridium (Ir) and tantalum (Ta) could not be observed on the lower side, and this means that the catalyst layer 112, 122 was dissolved and eluted. That is, it can be seen that the catalyst layer 112, 122 consisting of only the iridium (Ir) and the tantalum (Ta) in the comparative example disappeared, and thus the life span was very short.

FIG. 7A illustrates a first embodiment of the present invention and is a graph depicting a change in the mixed oxidant (MO) concentration of sterile water while a catalyst layer 112, 122 includes iridium (Ir), palladium (Pd), and tantalum (Ta) having the weight ratios of 60%, 20%, and 20%, respectively, FIG. 7B illustrates a second embodiment of the present invention and is a graph depicting a change in the mixed oxidant (MO) concentration of sterile water while a catalyst layer 112, 122 includes iridium (Ir), palladium (Pd), and tantalum (Ta) having the weight ratios of 50%, 30%, and 20%, respectively, and FIG. 7C is a graph depicting a change in the mixed oxidant (MO) concentration of sterile water while a catalyst layer 112, 122 includes iridium (Ir), palladium (Pd), and tantalum (Ta) having the weight ratios of 70%, 10%, and 20%, respectively.

Here, in relation to the mixed oxidant (MO), the kinds of the sterile water includes OCl$^-$, NaOCl, HOCl, and the like, and sterile water is generated through an oxidation reaction of Cl$^-$ ions contained in the source water.

Figure 7:
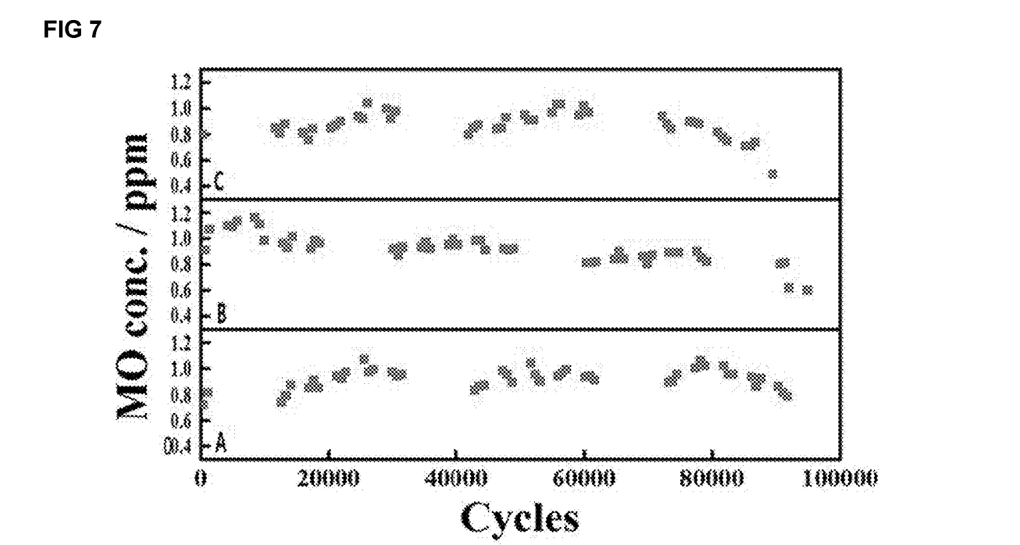
FIG. 7A illustrates a first embodiment of the present invention and is a graph depicting a change in the mixed oxidant (MO) concentration of a sterile water while a catalyst layer includes iridium (Ir), palladium (Pd), and tantalum (Ta) having the weight ratios of 60%, 20%, and 20%, respectively.
FIG. 7B illustrates a second embodiment of the present invention and is a graph depicting a change in the mixed oxidant (MO) concentration of a sterile water while a catalyst layer includes iridium (Ir), palladium (Pd), and tantalum (Ta) having the weight ratios of 50%, 30%, and 20%, respectively.
FIG. 7C is a graph depicting a change in the mixed oxidant (MO) concentration of a sterile water while a catalyst layer includes iridium (Ir), palladium (Pd), and tantalum (Ta) having the weight ratios of 70%, 10%, and 20%, respectively.

Referring to FIG. 7, unlike in the comparative examples of FIGS. 5 and 6, it can be seen that 0.5 ppm or more was maintained in all of the first to third embodiments even in the case of 60,000 cycles or more, which is a target life span. It can be seen that the MO concentration is maintained at 0.5 ppm or more even in the case of 90,000 cycles or more when the weight ratios of the iridium (Ir), the palladium (Pd), and the tantalum (Ta) are 60%, 20%, and 20%, respectively, and the life span and the durability thereof are more excellent than those in the above-described comparative example.

Figure 8:
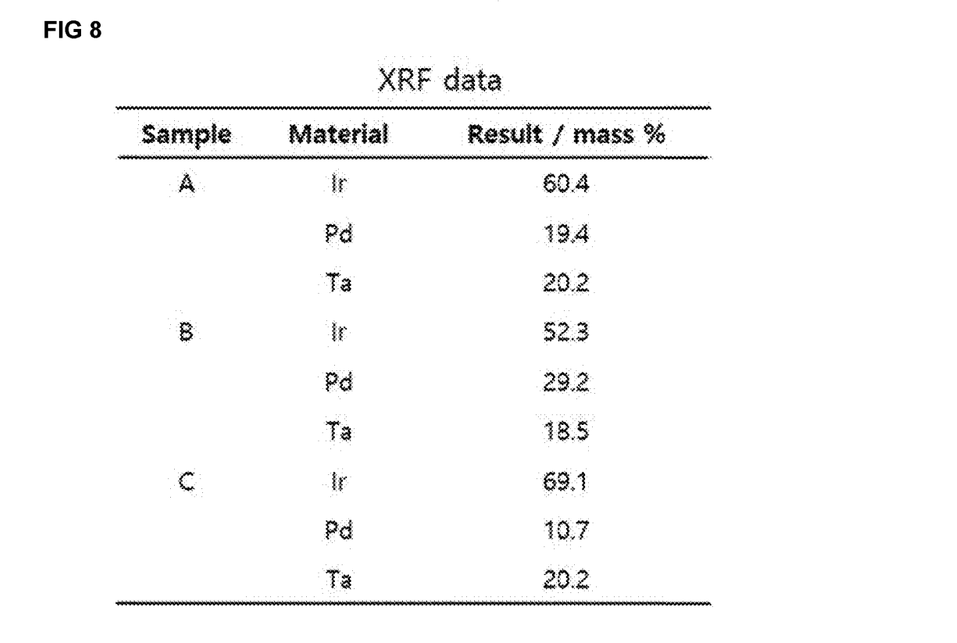
FIG. 8 is a table illustrating XRF data obtained by actually measuring the weight ratios of electrode materials used during experiments of the embodiments of FIG. 7.

FIG. 8 is a table illustrating XRF data obtained by actually measuring the weight ratios of electrode materials during experiments of the embodiments of FIG. 7, and it can be seen that the ratios are extremely similar those of FIG. 7, and thus there is almost no error.

Figure 9:
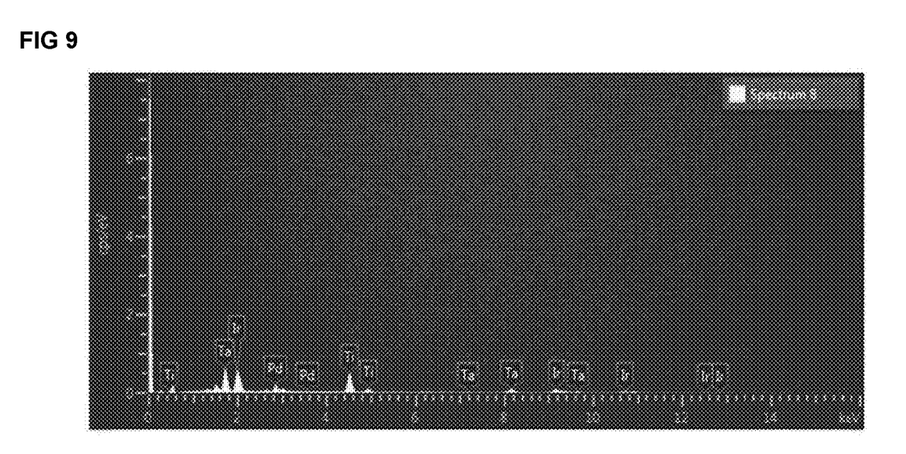
FIG. 9 is a graph obtained by spectrum-analyzing the electrode in the first embodiment of the present invention.

FIG. 9 is a graph obtained by spectrum-analyzing the electrode in the first embodiment of the present invention. Referring to FIG. 6 together with FIG. 9, all of the iridium (Ir), the palladium (Pd), and the tantalum (Ta) were observed in the oxidation electrode 110, and it can be seen that the iridium (Ir), the palladium (Pd), and the tantalum (Ta) that constitute the catalyst layer 112 are not delaminated even though the cycles are repeated, and consequently, it can be seen that the durability of the sterile water generating module is re mark ably excellent, and the use time period thereof becomes longer as well.

Although the embodiments illustrated in the drawings have been described in the specification for reference such that a person skilled in the art can easily understand and realize the present invention, they are merely exemplary, and a person skilled in the art can understand that various modifications and equivalent embodiments are also made from the embodiments of the present invention. Accordingly, the scope of the present invention should be determined by the claims.

The invention claimed is:

1. An electrode catalytic layer coated respectively on outer surfaces of an oxidation electrode and a reduction electrode used to generate sterile rater, wherein the electrode catalyst layer is formed on the outer surfaces of the electrodes to have a predetermined thickness, and is composed of iridium (Ir), palladium (Pd), and tantalum (Ta), and
wherein the palladium (Pd) has a weight ratio of 10% to 30%, and a sum of the weight ratios of the iridium (Ir) and the tantalum (Ta) is 70% to 90%.

2. The electrode catalyst layer of claim 1, wherein the weight ratios of the iridium (Ir), the palladium (Pd), and the tantalum (Ta) are 60%, 20%, and 20%, respectively.

3. The electrode catalyst layer of claim 1, wherein the weight ratios of the iridium (Ir), the palladium (Pd), and the tantalum (Ta) are 50%, 30, and 20%, respectively.

4. The electrode catalyst layer of claim 1, wherein the weight ratios of the iridium (Ir), the palladium (Pd), and the tantalum (Ta) are 70%, 10%, and 20%, respectively.

5. The electrode catalyst layer of claim 1, wherein the thickness of the catalyst layer is 0.3 μm to 5 μm.

6. The electrode catalyst layer of claim 1, wherein the mixed oxidant (MO) concentration of the sterile water is maintained at 0.5 ppm or more.

7. A sterile water generating module comprising the electrode catalyst layer of claim 1, the sterile water generating module comprising:
a pair of oxidation electrode and reduction electrode spaced apart from each other by a predetermined gap;
a current control unit configured to allow current to flow through the oxidation electrode and reduction electrode; and
a sterile water generating unit, on which the pair of oxidation electrode and reduction electrode are mounted, and configured to generate sterile water from source water supplied between the pair of electrodes.

8. The sterile water generating module of claim 7, wherein each of the pair of oxidation electrode and reduction electrode has a plate shape and is disposed to stand vertically and horizontally, and the source water is supplied into the predetermined gap.

9. The sterile water generating module of claim 7, wherein the current control unit controls such that a forward potential and a reverse potential are repeated in the pair of oxidation electrode and reduction electrode at a predetermined time interval, and the mixed oxidant (MO) concentration of the sterile water generated by the sterile water generating unit is controlled by adjusting the strength of current applied to the pair of oxidation electrode and reduction electrode.

10. The sterile water generating module of claim 9, wherein the predetermined time interval is 10 seconds, a forward potential of 10 seconds and a resting state of 10 seconds are repeated one to sixty times, and a reverse potential of 10 seconds and a resting state of 10 seconds are repeated one to sixty times, and
wherein the source water supplied to the sterile water generating unit is supplied at a speed of 0.3 L/min to 1.5 L/min (liters per minute; LPM).

\* \* \* \* \*